(12) United States Patent
Björklund et al.

(10) Patent No.: US 8,594,177 B2
(45) Date of Patent: Nov. 26, 2013

(54) REDUCING REFERENCE FRAME DATA STORE BANDWIDTH REQUIREMENTS IN VIDEO DECODERS

(75) Inventors: Andreas Björklund, Lund (SE); Ola Hugosson, Lund (SE)

(73) Assignee: ARM Limited, Cambridge (GB)

( * ) Notice: Subject to any disclaimer, the term of this patent is extended or adjusted under 35 U.S.C. 154(b) by 358 days.

(21) Appl. No.: 12/923,083

(22) Filed: Aug. 31, 2010

(65) Prior Publication Data

US 2012/0051437 A1    Mar. 1, 2012

(51) Int. Cl.
  *H04N 7/26*    (2006.01)
  *H04N 7/50*    (2006.01)

(52) U.S. Cl.
  USPC ..................... 375/240; 375/E7.027

(58) Field of Classification Search
  None
  See application file for complete search history.

(56) References Cited

U.S. PATENT DOCUMENTS

| | | | | |
|---|---|---|---|---|
| 5,262,854 | A * | 11/1993 | Ng | 375/240.24 |
| 6,130,911 | A * | 10/2000 | Lei | 375/240.16 |
| 6,272,180 | B1 * | 8/2001 | Lei | 375/240.16 |
| 2007/0253491 | A1 * | 11/2007 | Ito et al. | 375/240.24 |
| 2008/0056364 | A1 * | 3/2008 | Lyashevsky et al. | 375/240.13 |

FOREIGN PATENT DOCUMENTS

| | | |
|---|---|---|
| EP | 1 047 271 | 10/2000 |
| GB | 2 457 262 | 8/2009 |
| GB | 2483341 A1 * | 8/2011 |
| WO | WO 99/27715 | 6/1999 |
| WO | WO 2007/051202 | 5/2007 |

OTHER PUBLICATIONS

UK Search Report dated Dec. 15, 2011 for GB 1114294.0.

* cited by examiner

*Primary Examiner* — Jay Patel
*Assistant Examiner* — Reza Aghevli
(74) *Attorney, Agent, or Firm* — Nixon & Vanderhye P.C.

(57) ABSTRACT

A video processing apparatus, method and computer program are disclosed. The video processing apparatus comprises: first stage video processing circuitry for receiving a bitstream of compressed encoded video data representing a plurality of frames of video data and configured to perform one or more processing operations on the input compressed video data; analyzing circuitry configured to analyze the processed bitstream and to determine for at least one of the plurality of frames at least one portion of the at least one frame that is not required in the decoding of other frames and to generate at least one indicator indicating the at least one portion. The frame reconstruction processing circuitry is configured to perform frame reconstruction on the compressed encoded video data and to receive the at least one indicator and to generate at least one partial reference frame for use in decoding other frames from the bitstream and the at least one indicator, the frame reconstruction processing circuitry being configured to determine from the at least one indicator the at least one portion that is not required for decoding other frames and to generate the partial reference frame as a frame that does not include the at least one portion and to output the partial reference frame for use in decoding the other frames.

23 Claims, 7 Drawing Sheets

REDUCING REFERENCE FRAME DATA STORE BANDWIDTH REQUIREMENTS IN VIDEO DECODERS

TECHNOLOGY OVERVIEW

The field of the invention relates to video processing apparatus and a method for processing video data.

BACKGROUND

The amount of data required to represent video data is generally large and thus, prior to transmitting this data and in order to reduce the required bandwidth it is usually encoded and compressed to form an encoded bitstream.

Figure 1:
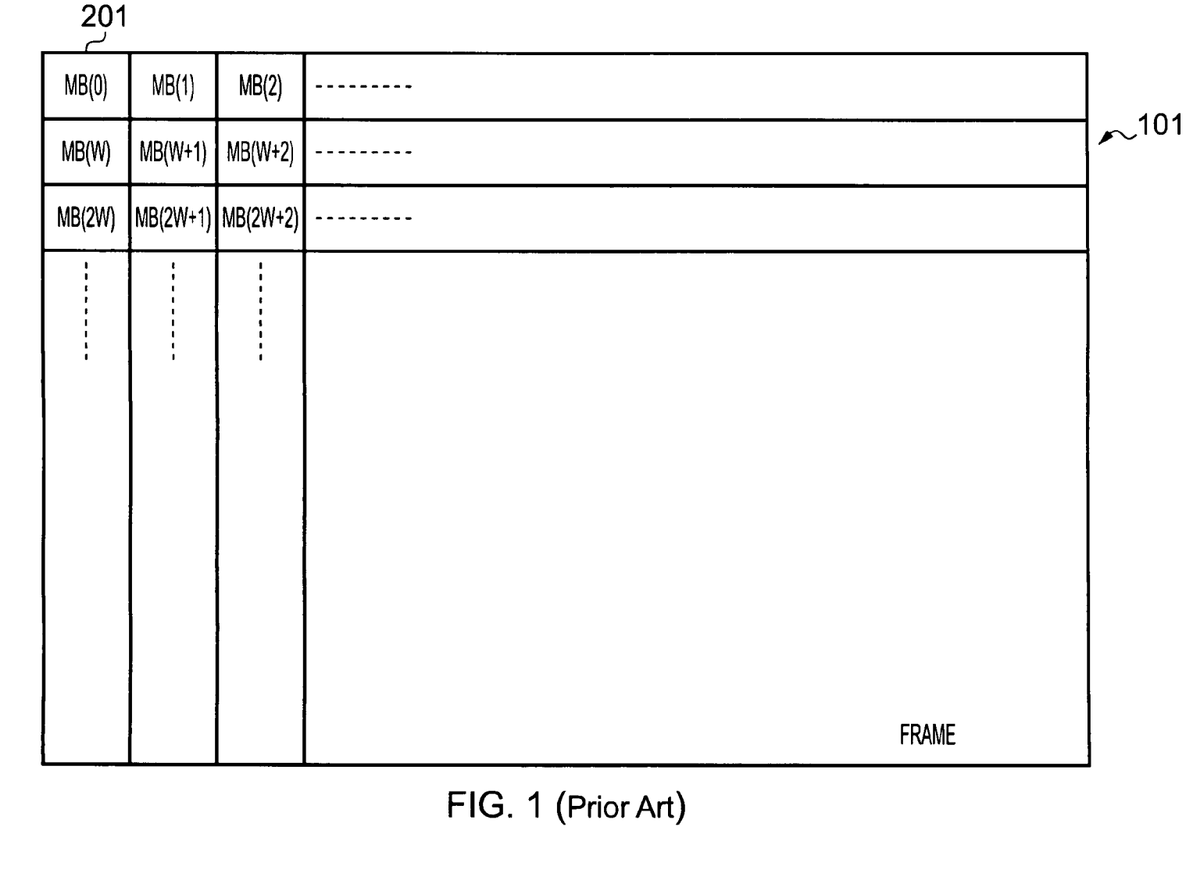
FIG. 1 illustrates how a frame of a video image is broken down into a sequence of macroblocks.

An apparatus receiving this encoded bitstream will need to perform a decoding operation in order to derive the pixel data for each video frame of a video image encoded in that bitstream. As shown schematically in FIG. 1, each frame 101 can be considered to be formed of a series of macroblocks (MBs) 201 arranged in a series of rows and columns. Each macroblock represents a block of adjacent pixels, for example a rectangular 16×16 array of pixels. However, for the purposes of the present application, the term macroblock is not intended to imply any particular size of block, and accordingly larger or smaller arrays of pixels can be represented by each macroblock.

Various encoding schemes for encoding this data are known and many use data from other frames in their vicinity to reduce the amount of data required to encode the frame. Thus, rather than transmitting all the information for one frame, some of the information may be transmitted as information on how this frame differs from one or more other frames and if the other frames are quite similar, which is usually the case with video, much less data may need to be sent. However, when decoding frames encoded in this way the other frames that were used will be required and thus, these previously decoded frames are used as reference frames in the decoder. A drawback of this is that the data in a reference frame is considerable and therefore, the bandwidth and the storage required to store the reference frames are also considerable.

It would be desirable to reduce the bandwidth and storage requirements associated with decoding video data.

SUMMARY

A first aspect of the present invention provides a video processing apparatus comprising: first stage video processing circuitry for receiving a bitstream of compressed encoded video data representing a plurality of frames of video data and configured to perform one or more processing operations on said input compressed video data; analysing circuitry configured to analyse said processed bitstream and for determining for at least one of said plurality of frames at least one portion of said at least one frame that is not required in the decoding of other frames and for generating at least one indicator indicating said at least one portion; frame reconstruction processing circuitry configured to perform frame reconstruction on said compressed encoded video data and to receive said at least one indicator and to generate at least one partial reference frame for use in decoding other frames from said bitstream and said at least one indicator, said frame reconstruction processing circuitry being configured to determine from said at least one indicator said at least one portion that is not required for decoding other frames and to generate said partial reference frame as a frame that does not include said at least one portion and to output said partial reference frame for use in decoding said other frames.

The inventors of the present invention recognised that although a frame may require one or more other frames to be decoded it often may not require the whole frame, only requiring one or more portions of the frame. They also recognised that some pre-processing of the bitstream could extract this information and then this information could be used when storing the reference frames, so that rather than storing a whole frame as a reference frame a partial reference frame could be stored with the portions not required for decoding other frames omitted from the stored partial reference frame. In this way the storage requirements for the reference frames and the bandwidth requirements for transmitting them to storage could be reduced.

It should be noted that generally the pre-processing of the frames comprising the determination of the portions not required for the reference frames takes less time than the frame reconstruction and thus, this processing will naturally run in front of the frame reconstruction over time and will be able to provide indicators in advance of the frame reconstruction circuitry needing the information to store the reference frames.

It should be noted that the analysing circuitry can be circuitry configured for this task when the circuitry is manufactured or it can be circuitry that is configured for this task by software running on the circuitry.

In some embodiments said first stage processing circuitry is configured to generate and output to a data store an intermediate representation of said input video data, and said frame reconstruction processing circuitry is configured to retrieve said intermediate representation of said input video data from said data store and to process said intermediate representation data to perform said frame reconstruction.

Although the first stage processing may simply be performed to determine which portions of frames are required as reference frames and the processed data not used for anything else, the first stage processing may in some embodiments be a first stage of the decoding process and produce an intermediate representation of the input video data which can be used not only to determine which portions of the reference frames are not required but also as a first stage in decoding.

Some decoders of the prior art have found that it is convenient to form a video decoder in two stages. This is because the encoded bitstream may contain a sequence of macroblocks in encoded form, and due to the content represented by each macroblock, macroblocks may be of significantly different sizes. Further, there will be dependencies between various macroblocks, meaning that the content represented by one macroblock can only be fully decoded once one or more other macroblocks have been decoded. Accordingly, it is known to split the decoding operation into two stages.

Accordingly, in the prior art, decoders have been devised that run in two stages. The Inventors of the current invention recognised that in a two stage system where an intermediate representation of the video data is retrieved in a first stage, information can be extracted from this intermediate representation data indicative of which portions of frames are required for decoding other frames. This information can then be used when storing these frames as reference frames for use in decoding, so that rather than storing a whole frame as a reference frame a partial reference frame can be stored with the portions not required for decoding other frames omitted from the partial reference frame. In this way the storage requirements for the reference frames and the bandwidth requirements for transmitting them to storage are reduced.

In some embodiments, said first stage video processing circuitry comprises parsing circuitry, said intermediate representation data comprising partially decompressed video data comprising a plurality of instructions.

The first stage video processing circuitry comprises circuitry that partially decompresses the video data. Provided the partially decompressed video data comprises enough information for the analysing circuitry to be able to determine whether a macroblock is required to decode another block then the exact form of this first state of video processing circuitry is not very important. However, it is generally parsing circuitry that is used in a first stage as it has been found advantageous to decouple this stage from the later frame reconstruction stage as the parsing of the video data takes different amount of time depending on the type of data being currently received, while the frame reconstruction is relatively time independent. Generally the intermediate representation generated by the parsing circuitry contains instructions which describe the operations the decoder needs to perform on the macroblocks to decode them.

Thus, a first stage may be a parsing stage, in which each of the encoded macroblocks in the bitstream are partially decoded in their received sequence in order to remove any bitstream encoding dependencies between the macroblocks. This creates a partially decoded bitstream in an intermediate form which is then input to a second stage of decode referred to as a frame reconstruction stage, where individual macroblocks are fully decoded in order to determine the pixel data represented by those macroblocks. Due to the removal of bitstream encoding dependencies, the intermediate form is a representation which can be interpreted without being read in the same macroblock order as the original bitstream. It should be noted however that there are typically still other types of dependencies, such as intra prediction pixel dependencies, which are not removed by the initial stage.

Once the parsing stage has been performed to generate the intermediate form where any bitstream encoding dependencies between the macroblocks have been removed, the amount of time taken to process each macroblock within the next pipe stage, for example to perform inverse transform operations, motion compensation operations, etc, is predictable, i.e. relatively fixed. However, the time taken to parse any particular macroblock can vary very significantly, since the amount of processing required to perform the parsing operation will vary from macroblock to macroblock dependent on the content and hence sizes of those macroblocks. Thus, if the parse stage is to be run in synchronisation with the frame reconstruction stage, then the parse circuitry needs to be able to cope in real time with the significant variation in complexity of the parsing operation on a macroblock by macroblock basis, leading to a significant increase in the cost and complexity of the parsing circuitry. This creates a partially decoded bitstream in an intermediate form which is then input to a second stage of decode referred to as a frame reconstruction stage, where individual macroblocks are fully decoded in order to determine the pixel data represented by those macroblocks. Due to the removal of bitstream encoding dependencies, the intermediate form is a representation which can be interpreted without being read in the same macroblock order as the original bitstream. It should be noted however that there are typically still other types of dependencies, such as intra prediction pixel dependencies, which are not removed by the initial stage.

In some embodiments, said analysing circuitry is configured to analyse a plurality of portions of said at least one frame and said analysing circuitry comprises a predictor for predicting for each of said plurality of portions whether or not it is likely to be used in decoding of other frames and in response to predicting that it is likely to be used said analysing circuitry is configured not to generate said at least one indicator for said portion of said frame.

Although the use of an indicator can reduce the amount of data that is output and stored as reference frames, the generation of this indicator requires analysis of the data and thus, has its own power and storage overheads. Thus, it may be advantageous to have a predictor that predicts whether a portion of the frame is likely to be used for decoding other frames and if it is predicted that it is likely then no indicator is generated. If it can be determined that it is likely that a portion will be needed in a reference frame then the time and storage required to generate and store the indicator bit for this portion will be unlikely to provide any benefit in reference frame reduction and thus, predicting where this is the case and not generating indicators can be advantageous.

In some embodiments, said predictor determines an amount of intermediate representation data present for each portion and in response to said amount of data for said portion being greater than a predetermined amount said predictor predicts that said portion is unlikely to be used.

One way to predict whether or not a portion of the intermediate representation data is likely to be used for decoding another portion of a frame is the amount of data in that portion. If a lot of data is present in the portion then the encoding is probably done on its own without using data from other frames and it is unlikely that other frames will use this portion. Thus, if the amount is less than a certain amount no indicator is generated while if it is more then an indicator may be generated.

In some embodiments, said analysing circuitry is configured to determine a type of encoding of a frame said processed bitstream represents and in response to determining a predetermined type of encoding for said frame not to generate said at least one indicator for said frame.

A further way of predicting whether or not a whole reference frame may be required is from the type of frame. Some types of frames in some encoding systems are often used as reference frames and it is likely that the whole of the frame will be needed. In such cases, it may not be worth analysing it and generating indicator bits and so no indicator bits are generated for certain frames and thus, when this type of frame is used as a reference frame the whole frame is output and not a partial frame.

In some embodiments, said analysing circuitry comprises scoreboard generating circuitry for analysing said processed bitstream and for determining for at least some of said frames, portions of said frames that are to be used in the decoding of other frames and portions that are not to be used and for generating scoreboard data for said at least some frames, said scoreboard data comprising a plurality of said at least one indicator, said plurality of indicators each providing an indication as to whether a corresponding portion is required for decoding other frames or not.

The indicators may form scoreboards for each frame. The scoreboards are formed of a plurality of indicators, the indicators indicating whether or not a particular portion of the frame is required in the reference frame. Clearly, the indicator could indicate that the portion is required or that it is not required but generally an indicator is used to indicate that the portion is not required as this is the unusual situation and therefore if no indicator is present it is determined that that portion of the reference frame is required.

In some embodiments, said encoded video data comprises a plurality of macroblocks forming said frames, each macroblock representing a plurality of pixels forming an area of said frame, said at least one portion of said frame comprising a macroblock.

Although the encoded video data may have a number of forms in some embodiments it is formed of macroblocks and the portions of the frames that are considered by the analysing circuitry are macroblocks. It should be noted that a macroblock is a rectangular array of pixels, it may be the same as a macroblock of the video codec standard or it may be a different sized rectangular array. In any case in this context it is the smallest rectangular entity for which indicators are generated.

In some embodiments, said analysing circuitry is configured to output said at least one indicator to said data store, said frame reconstruction processing circuitry being configured to retrieve said at least one indicator and said intermediate representation data from said data store.

Depending on the amount of indicator data generated, it may be output to the data store that stores the intermediate representation data or if there is not a lot of indicator data generated, for example if some of the optimizations for not generating indicator data for particular types of frames or particular sizes of macroblocks are used then the indicator data may be output directly to the frame reconstruction processing circuitry and stored on the video processing apparatus itself. The choice of which of these two alternatives is used depends on the amount of indicator data generated. Clearly if there is a lot of indicator data generated then external data storage may be required but if there is less generated then this can be stored on the processing apparatus itself and the bandwidth required for transmitting this data is then reduced.

In some embodiments, the video data apparatus comprises the data store, while in others it is an external data store that the video processing apparatus transmits the data to.

In some embodiments, said frame reconstruction processing circuitry is configured to output said at least one partial reference frame to a frame data store.

The reference frames themselves are quite large even if they are only partial reference frames and thus, in embodiments they are output to an external data store as well. This data store may be the same as the data store used to store the intermediate representation data or it may be a different data store.

In some embodiments, said first stage video processing circuitry is configured to process said received encoded video bitstream in advance of said frame reconstruction processing said processed bitstream by at least a plurality of frames, and said analysing circuitry is configured to detect when said at least one frame is not required to decode any further frames currently being processed by said first stage video processing and in response to said detection to output said at least one indicator.

As noted previously having a two-stage video processing circuitry enables the first stage to be decoupled from the second stage which is convenient if the first stage takes a varying amount of time to process different portions of the stream. In some embodiments, the first stage is in advance of the second stage by a plurality of frames and the analysing circuitry outputs the indicator data when it realises that the frame for which it has indicator data stored is no longer used in the decoding of other frames that are currently being processed in the first stage video processing circuitry.

A second aspect of the present invention provides a method of processing data comprising the steps of: receiving a bitstream of compressed encoded video data representing a plurality of frames of video data and performing one or more processing operations on said input compressed video data to generate a processed bitstream; analysing said processed bitstream and determining for at least one of said plurality of frames at least one portion of said at least one frame that is not required in the decoding of other frames and generating at least one indicator indicating said at least one portion; performing frame reconstruction on said compressed encoded video data and receiving said at least one indicator, including generating at least one partial reference frame for use in decoding other frames from said compressed encoded video data and said at least one indicator, by determining from said at least one indicator said at least one portion that is not required for decoding other frames and generating said partial reference frame as a frame that does not include said at least one portion; outputting said partial reference frame.

A third aspect of the present invention provides a computer program product for storing a computer program which when executing other processing apparatus controls said processing apparatus to perform to steps in a method according to a second aspect of the present invention.

A fourth aspect of the present invention provides a means for processing video data comprising: first stage video processing means for receiving a bitstream of compressed encoded video data representing a plurality of frames of video data and for performing one or more processing operations on said input compressed video data to generate and output to a data store an intermediate representation of said input video data; analysing means for analysing said intermediate representation data and for determining for at least one of said plurality of frames at least one portion of said at least one frame that is not required in the decoding of other frames and for generating at least one indicator indicating said at least one portion; frame reconstruction processing means for retrieving from said data store said intermediate representation data and for receiving said at least one indicator and for generating at least one partial reference frame for use in decoding other frames from said intermediate representation data and said at least one indicator, said frame reconstruction processing means being for determining from said at least one indicator said at least one portion that is not required for decoding other frames and for generating said partial reference frame as a frame that does not include said at least one portion and for outputting said partial reference frame for use in decoding said other frames.

The above, and other objects, features and advantages of this invention will be apparent from the following detailed description of illustrative embodiments which is to be read in connection with the accompanying drawings.

DESCRIPTION OF NON-LIMITING EXAMPLE EMBODIMENTS

Figure 2:
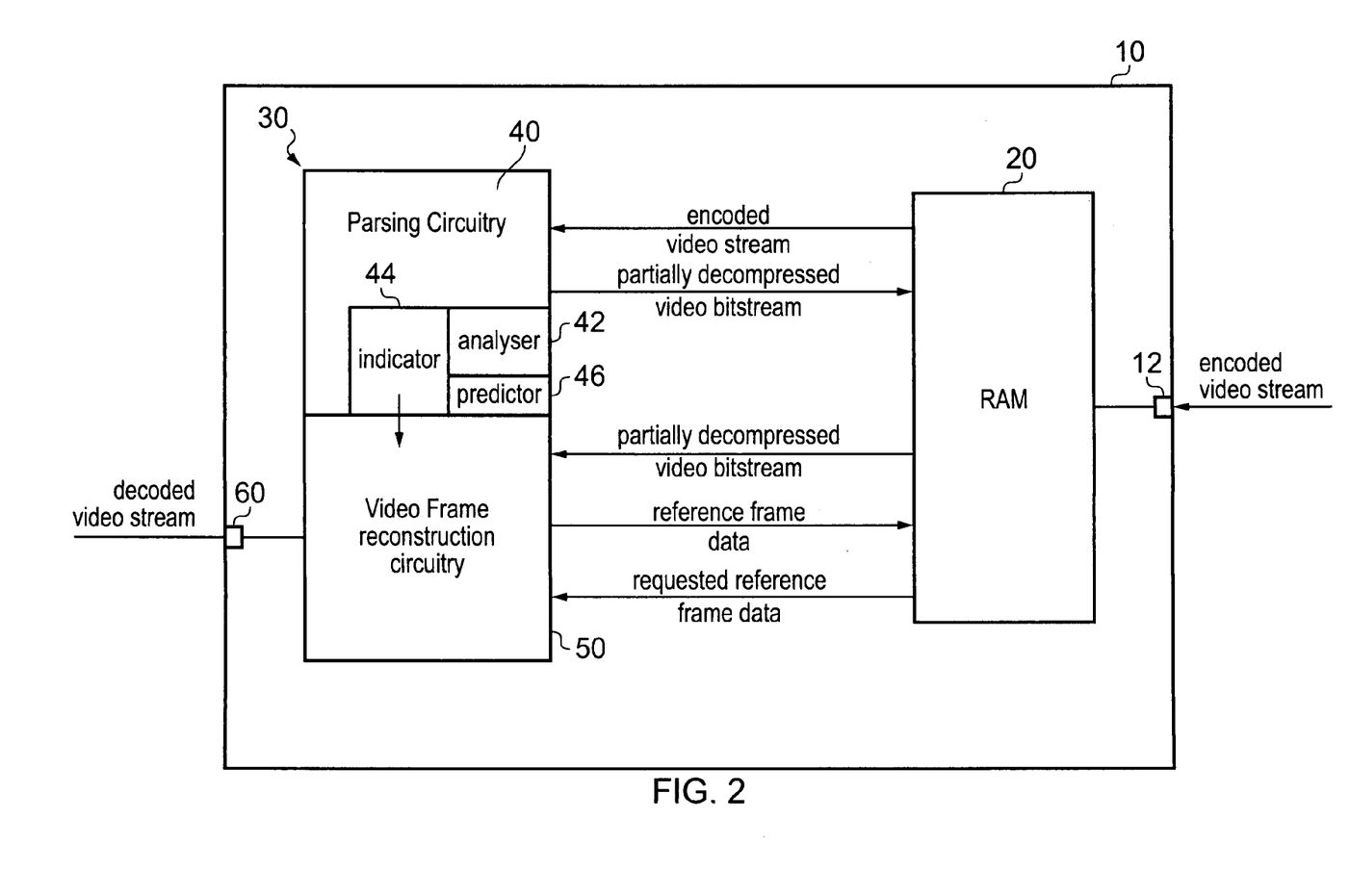
FIG. 2 shows a video decoding apparatus according to an embodiment of the present invention.

FIG. 2 shows a video processing apparatus 10 for decoding encoded video data. An encoded video bitstream is received at input 12 and is input to a RAM data store 20. RAM 20 acts as a buffer to store the input data and to output it to video processing apparatus 30 which processes the encoded data and generates a decoded video stream.

The encoded video bitstream is in this embodiment formed of macroblocks which represent blocks of adjacent pixels, a plurality of macroblocks together forming a frame of video data to be displayed.

Video processing apparatus 30 comprises parsing circuitry 40 which partially decompresses the input video bitstream and removes bitstream encoding dependencies between the macroblocks and generates a partially decompressed video bitstream which is then output back to RAM 20 for storage. Parsing circuitry 40 includes analysing circuitry 42 which analyses this partially decompressed video bitstream and from it determines which macroblocks in the stream are required for decoding macroblocks of other frames and it generates and stores indicators within indicator store 44 that indicate whether a macroblock of a frame is required for decoding another frame or not. Thus, indicator store 44 will store indicators for at least some of the macroblocks and these are updated by the analysing circuitry as is described below. It should be noted that the use of the term macroblock in this context is used to describe a rectangular array of pixels. In some embodiments this may be the same rectangular array of pixels as that of a macroblock described in the video codec standard while in other embodiments it may be a different sized rectangular block, perhaps a smaller rectangular block, of say 8×16 pixels. In any case it is the smallest rectangular block that indicators are generated for.

Before a partially decompressed macroblock is output to RAM 20 the analysing circuitry 42 will have analysed that macroblock and determined which other macroblocks, if any, it requires to be decoded. If it requires any other macroblocks then indicators in indicator store 44 corresponding to these macroblocks will be updated, indicating that they are required by another frame in decoding. When the analysing circuitry determines that a frame for which indicators are stored in indicator store 44 is no longer required for the decoding of any further macroblocks received in the encoded video bitstream then the indicator values for that frame no longer need updating and can be output. In this embodiment, indicator bits indicating macroblocks that are not required for decoding other frames are output to the video frame reconstruction circuitry 50, where they are stored until they are no longer required.

As the indicators are stored within the video processing apparatus 30, storage space is limited, and it is advantageous if the number of indicators generated and stored is constrained. In this embodiment, analysing circuitry 42 comprises predictor circuitry 46 for predicting occasions where the generation of indicator bits are unlikely to provide any benefit and thus, in such cases it inhibits the generation of indicator bits. In this embodiment predictor circuitry 46 analyses the size of a macroblock and if it is larger than a predetermined size it will determine that this macroblock has a lot of data and is unlikely to use data from other frames to be decoded and is also unlikely to be used by other macroblocks. For example, it may be an edge of a moving object. If, however, it is determined that the macrobox is smaller than a particular size it may require other macroblocks to decode it and is likely to be used as a reference for other macroblocks and thus, one optimization of this particular embodiment is for the predictor circuitry 46 to inhibit the generation of indicators for macroblocks that are less than a predetermined size. If they are greater than a predetermined size then an indicator bit is set to indicate that this macroblock does not need to be output in the reference frame. The indicator bit may later be reset if when analysing another macroblock it is determined that actually this macroblock is required. In this way, the amount of analysis performed by the analysing circuitry is reduced as is the amount of data stored and output as indicator data.

A further optimization that is performed by the predictor circuitry is that if a frame is recognised to be a particular type of frame for which it is likely the whole of the frame will be used as a reference frame then the analysing circuitry does not generate, store or output any indicators at all for this frame.

In this way, the number of indicators generated, stored and output by analysing circuitry 42 is reduced. This means that the indicator store 44 can be within video processing apparatus 30 and this reduces the amount of data that needs to be transmitted to and from the RAM 20.

Video processing apparatus 30 comprises a second decoding stage, the video frame reconstruction circuitry 50. This circuitry receives the partially decompressed video bitstream via RAM 20 and performs decoding operations which include the generation of reference frame data which is required for the decoding of some frames. This reference frame data is quite large and cannot be stored locally within video frame reconstruction circuitry 50 and is therefore sent via interconnect circuitry to be stored on RAM 20. The amount of reference frame data that is sent for storage is dependent on the indicator values received from parsing circuitry 40. In this respect, the video frame reconstruction circuitry does not always send whole frames as reference frames. If there is an indicator received indicating that a particular macroblock is not required for decoding other frames then this macroblock is not sent in the reference frame data and thus, the amount of data sent for each reference frame may be reduced.

The video frame reconstruction circuitry 50 requests the reference frame data macroblocks from RAM 20 that it requires during decoding and when it has decoded a frame it will output the decoded data in the form of a decoded video stream via output 60.

Figure 3:
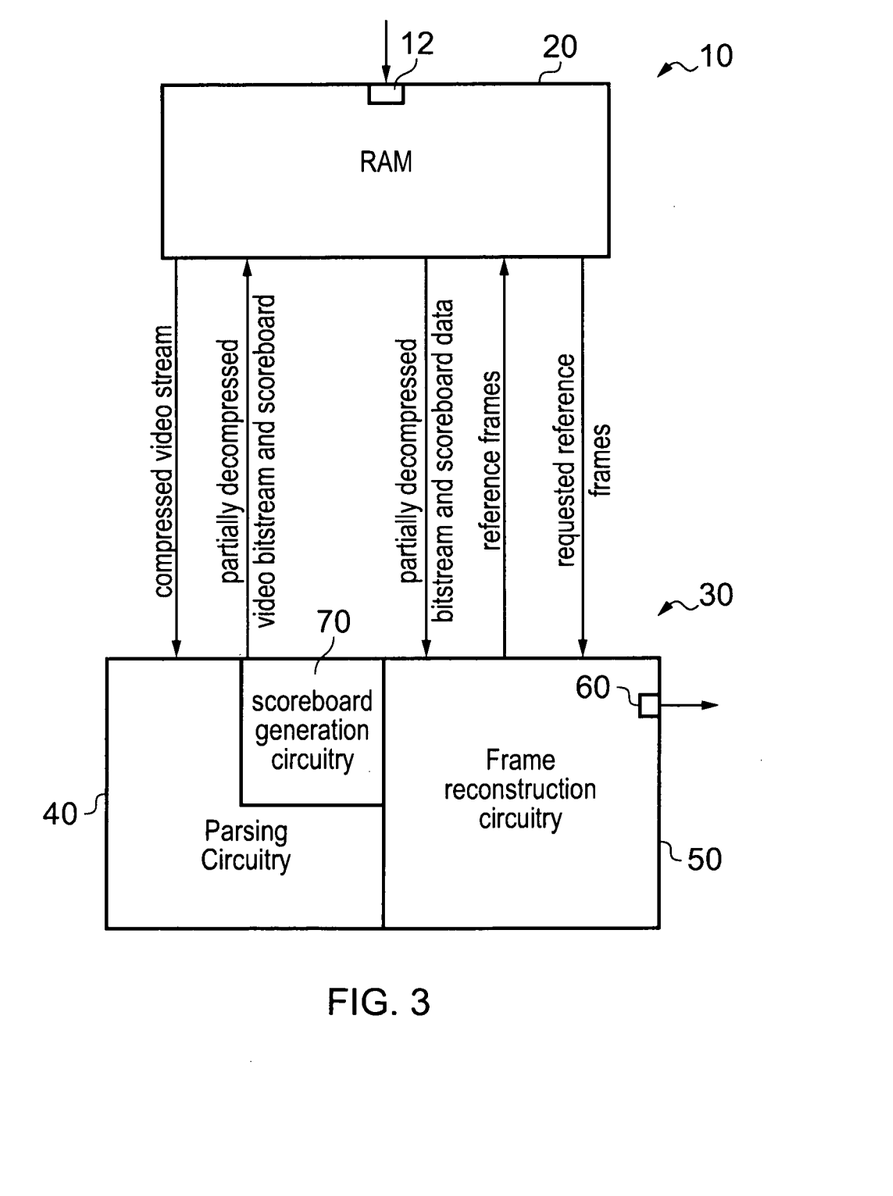
FIG. 3 shows an alternative embodiment of a video decoding apparatus.

FIG. 3 shows an alternative embodiment of the video processing system 10 in which like reference numerals are used to describe similar parts. This system comprises a video processing apparatus 30 and an external data store 20 comprising a RAM. Video processing apparatus 30 comprises parsing circuitry 40 that in this embodiment has scoreboard generation circuitry 70. The compressed video stream is received via RAM 20 at parsing circuitry 40 and is partially decompressed by the parsing circuitry. The partially decompressed video stream is analysed by scoreboard generation circuitry 70 and is output to RAM 20. Scoreboard generation circuitry 70 determines for each macroblock of each frame whether or not it is required for decoding another frame and updates an indicator in its scoreboard to indicate this. When scoreboard generation circuitry 70 determines that a frame for which it is storing indicators in the form of a scoreboard is not required by any further frame for decoding, it can then output this scoreboard as it knows that it is complete. In this case, as the scoreboards are relatively large it is output to external data store RAM 20 and stored there. It should be noted that in some video data streams certain frames are marked as never been used as reference frames and if this is the case, the scoreboard generation circuitry will not generate a scoreboard for this reference frame.

The frame reconstruction circuitry 50 receives the partially decompressed video stream and the related scoreboard data from RAM 20 and from this data it generates partial reference frames in which the macroblocks that are indicated by the scoreboard as not being required for decoding other frames are not included. These partial reference frames are then output to RAM 20 and stored there. When the frame reconstruction circuitry requires a macroblock from a reference frame it requests it from the RAM and this data is returned for use in decoding a video frame. Once the video frames have been decoded they are output as a video output stream at output port 60.

Figure 4:
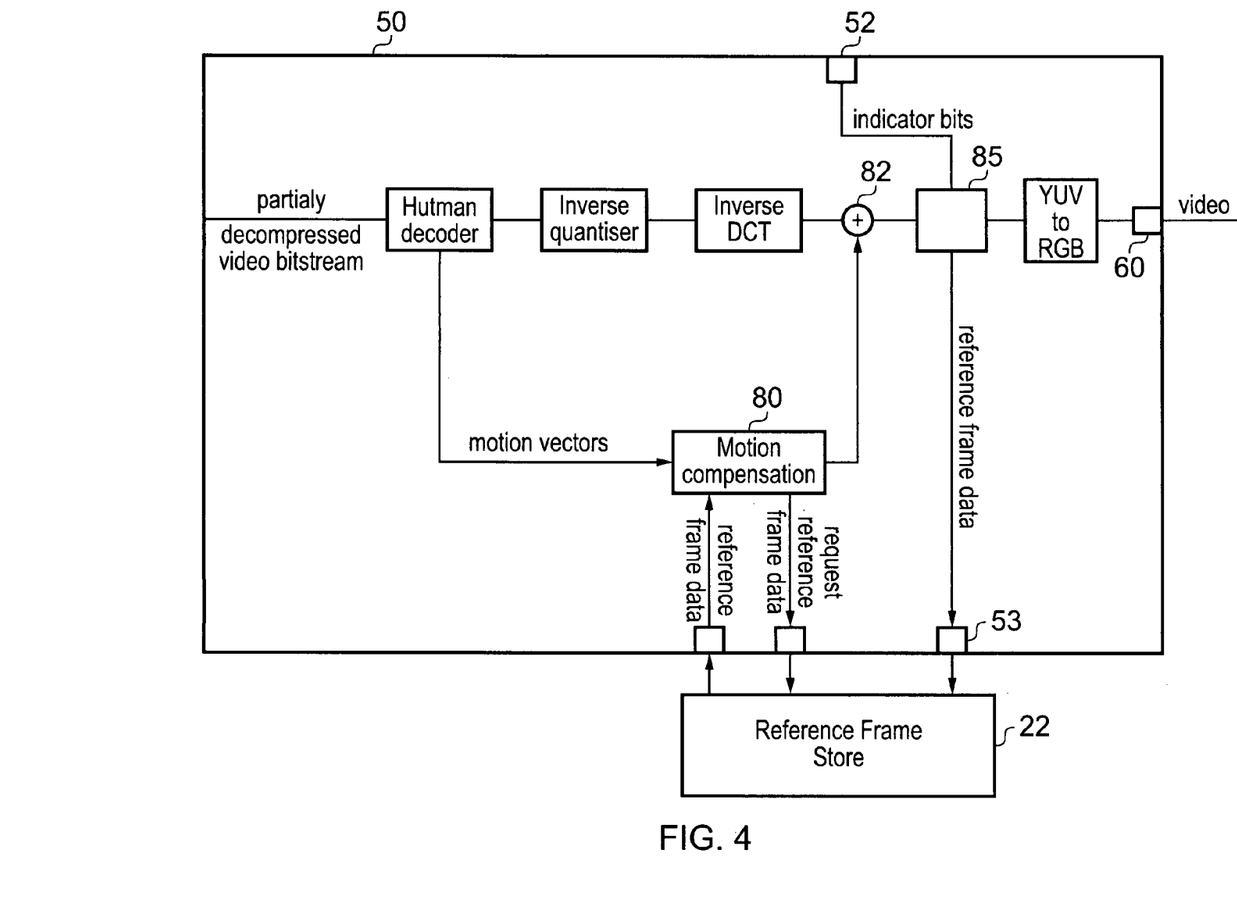
FIG. 4 shows frame reconstruction circuitry according to an embodiment of the present invention.

FIG. 4 shows an example of frame reconstruction circuitry 50 for a MPEG video stream. MPEG is a compression methodology in which video frames are encoded as a group of pictures, with three different types of encodings being used for the frames. There are intra-coded or I-frames, predictive coded or P-frames and bidirectional predictive coded or B-frames in each group of pictures. I-frames do not require other frames to be decoded, while, P-frames and B-frames do.

The frame reconstruction circuitry 50 of FIG. 4 receives the partially decompressed video bitstream from the parsing circuitry as in the other embodiments and this is then passed through several decoders for decoding the video bitstream. There is a Huffman decoder that retrieves motion vectors from the stream, an inverse quantizer and an inverse discrete cosine transform decoder. The motion vectors require information from reference frames in order for the motion compensation circuitry 80 to perform motion compensation on the decoded video stream at decoder 82. Thus, motion compensation circuitry 50 requests reference frame data from a reference frame data store 22 and in response to this performs the motion compensation. The decoded video stream output from the inverse discrete cosine transform device passes through the motion compensation combiner circuitry 82 to reference frame construction circuitry 85. This constructs the reference frames from the decoded data using indicator bits received from parsing circuitry at input 52. These indicator bits indicate which macroblocks are required in the reference frame and thus, the appropriate reference frame data is generated and output via output 53 to reference frame store 22. This data can then be retrieved as required and used in the motion compensation. There is a final decoding stage that generates the pixel data that is then output at the video output 60.

Figure 5:
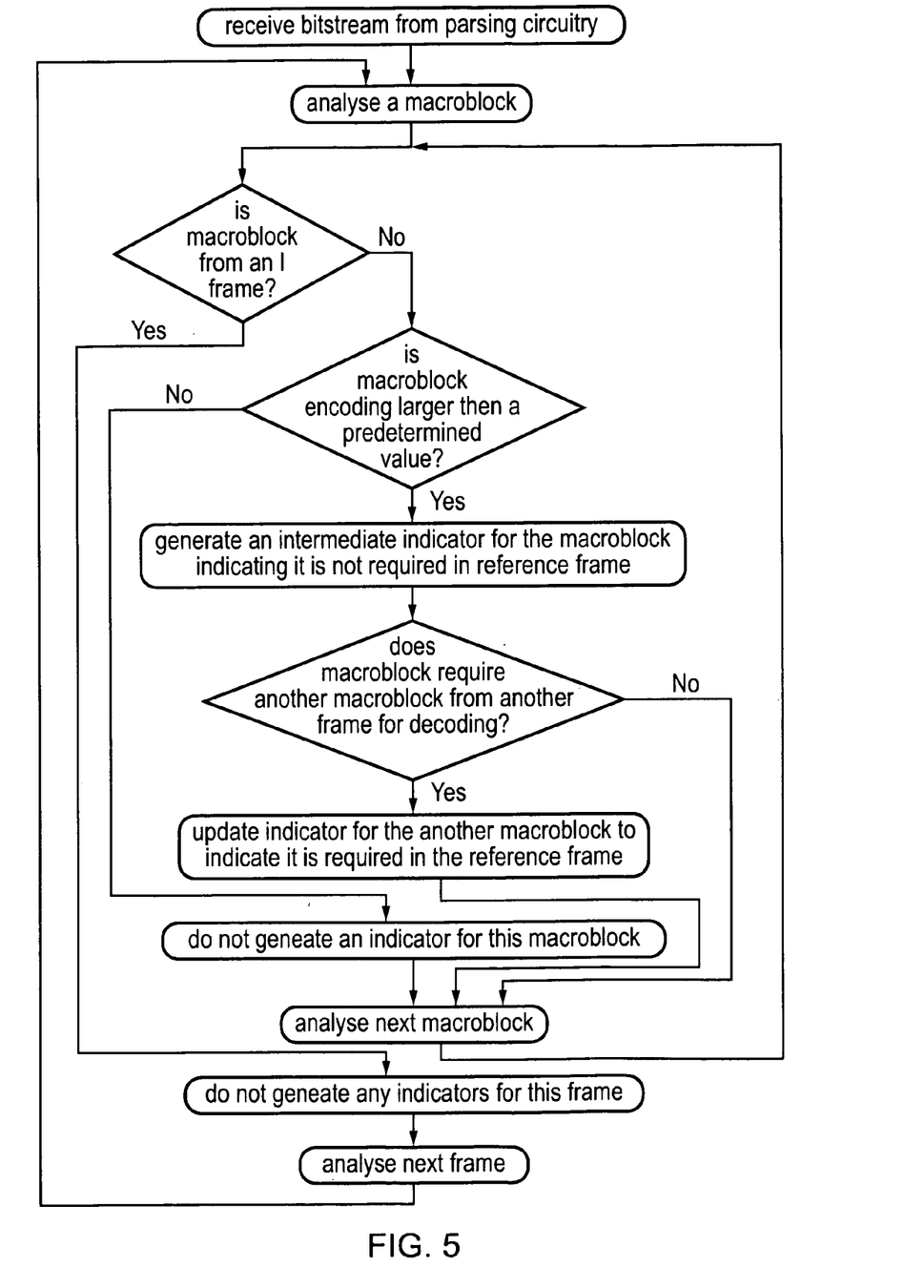
FIG. 5 shows steps in a method of processing video data according to an embodiment of the present invention.

FIG. 5 shows a flow diagram illustrating steps in a method according to an embodiment of the present invention.

Initially a bitstream is received from the parsing circuitry and each macroblock in this bitstream is analysed. First it is determined if a macroblock is from an I-frame. If it is then it is likely that the whole of this frame will be needed for decoding other frames and thus, the analysing circuitry does not analyse the macroblocks in this frame to determine if they are not required in a reference frame but goes on to the next frame. This is because it is likely that all macroblocks will be needed from these frames and analysing them and outputting indicator bits for each macroblock will consume power and data storage and is unlikely to provide any benefit.

The next step determines if the macroblock is larger than a predetermined value. If it is then it is unlikely that this block will be used in the decoding of other macroblocks as it is a block that has required a lot of data to encode and is probably something like an edge of a moving object. These are generally not encoded using data from other macroblocks but are encoded on their own and thus, an indicator is generated for this macroblock indicating that it will not be required in reference frames. If the macroblock is smaller than a predetermined value then it is very likely that it will be used for another frame in decoding and thus, no indicators are generated for this macroblock. This is because as it is very likely that it will be used and the consumption of power and data storage required to generate the indicators will probably not provide a benefit and thus, in some embodiments it is determined not to be worthwhile to generate indicators in such a case.

Intermediate indicators are then generated for all of the other macroblocks indicating that they are not required in a reference frame. It is then determined if a received macroblock requires another macroblock from another frame for decoding. If it does not then the next macroblock is analysed. If it does then the indicator for the other macroblock is updated to indicate that it is required in the reference frame. The next macroblock is then analysed. In this way indicators are generated for macroblocks that indicate whether or not they are required in reference frames. As noted previously some macroblocks do not have indicators generated for them. Once it is determined that a frame is no longer required for decoding any of the frames that are currently being received then the indicators for this frame are output to the frame reconstruction circuitry. These steps are not shown in this Figure but similar determination steps to those shown with respect to the flow diagram of FIG. 6 are performed.

Figure 6:
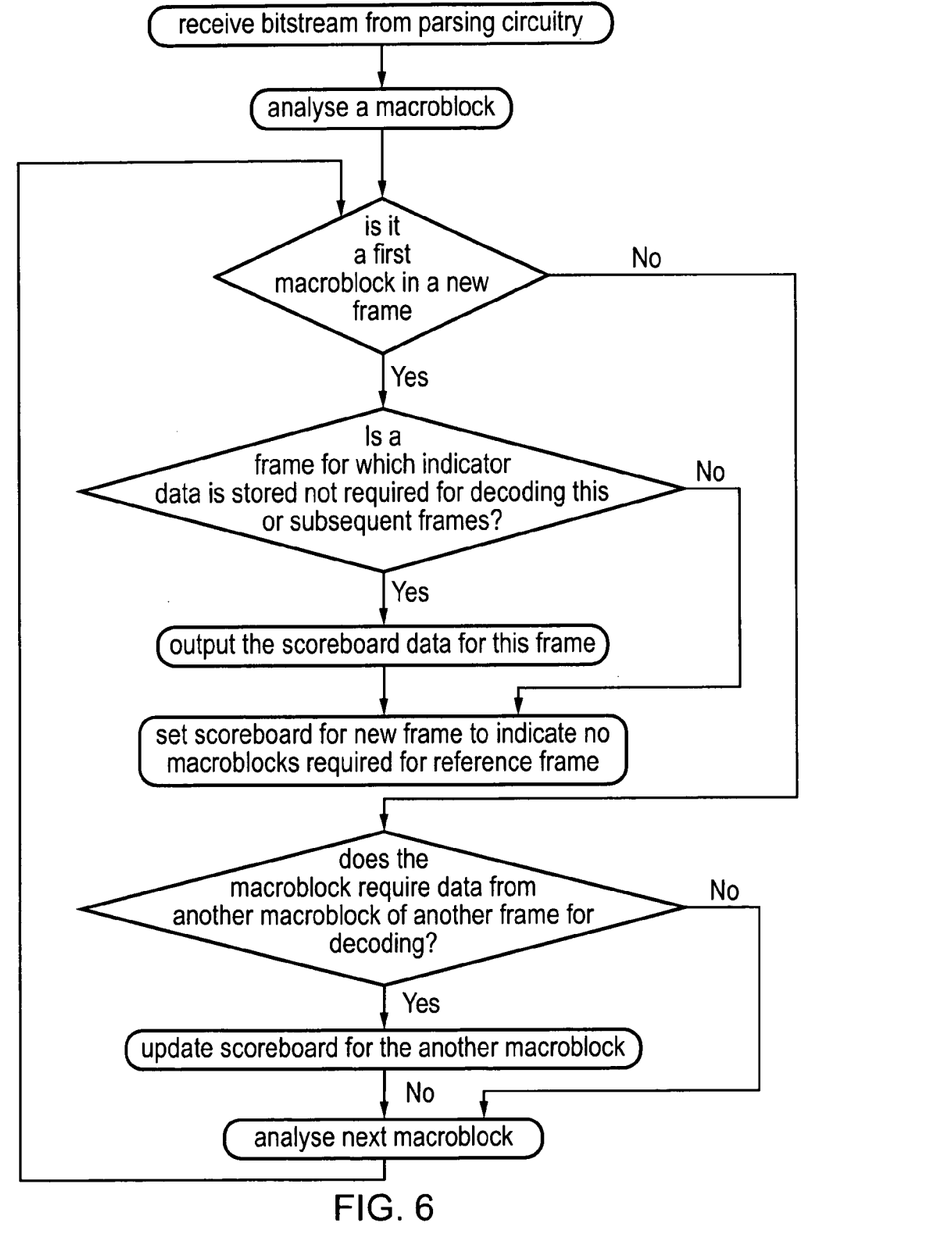
FIG. 6 shows steps in a method of generating scoreboards of indicator data indicating whether or not macroblocks are required for reference frames.

FIG. 6 shows a flow diagram illustrating a method according to an embodiment of the present invention. Initially a bitstream is received from parsing circuitry and a macroblock is analysed. It is determined if it is a first macroblock in a new frame. If it is, then it is determined if there is indicator data in the data store for a frame that is not used by the frame just received or by any subsequent frames for decoding. If it is determined that there is such indicator data stored then this is output as it will no longer be updated as all subsequent frames will not use this frame for decoding purposes.

If there is no indicator data relating to such a frame then the scoreboard for this new frame is simply set to indicate that none of the macroblocks constituting this frame are required for a reference frame. In other words, each bit in the scoreboard is set to indicate that the corresponding macroblock for that frame is not required.

Each macroblock is then analysed in turn and it is determined if the macroblock requires data from another macroblock of another frame for decoding. If it does then the scoreboard for this other macroblock is updated. All scoreboards are initially set to indicate that each macroblock is not required for the reference frame and each time a macroblock of another frame indicates that it requires another macroblock the indicator bit for that macroblock is updated to indicate that this portion is in fact required.

The next macroblock is then analysed.

Thus, this Figure shows how the scoreboards are initially set to indicate that no macroblocks need to be output for the reference frame and these are updated as other frames indicate that they need particular macroblocks in their decoding. Furthermore, this figure indicates how, it is determined when the bitstream currently being received no longer uses stored scoreboards for a particular frame in decoding and as at this point the scoreboard will no longer be updated by analysis of further macroblocks, the scoreboard can be output to the frame reconstruction circuitry where it is used for frame reconstruction.

Figure 7:
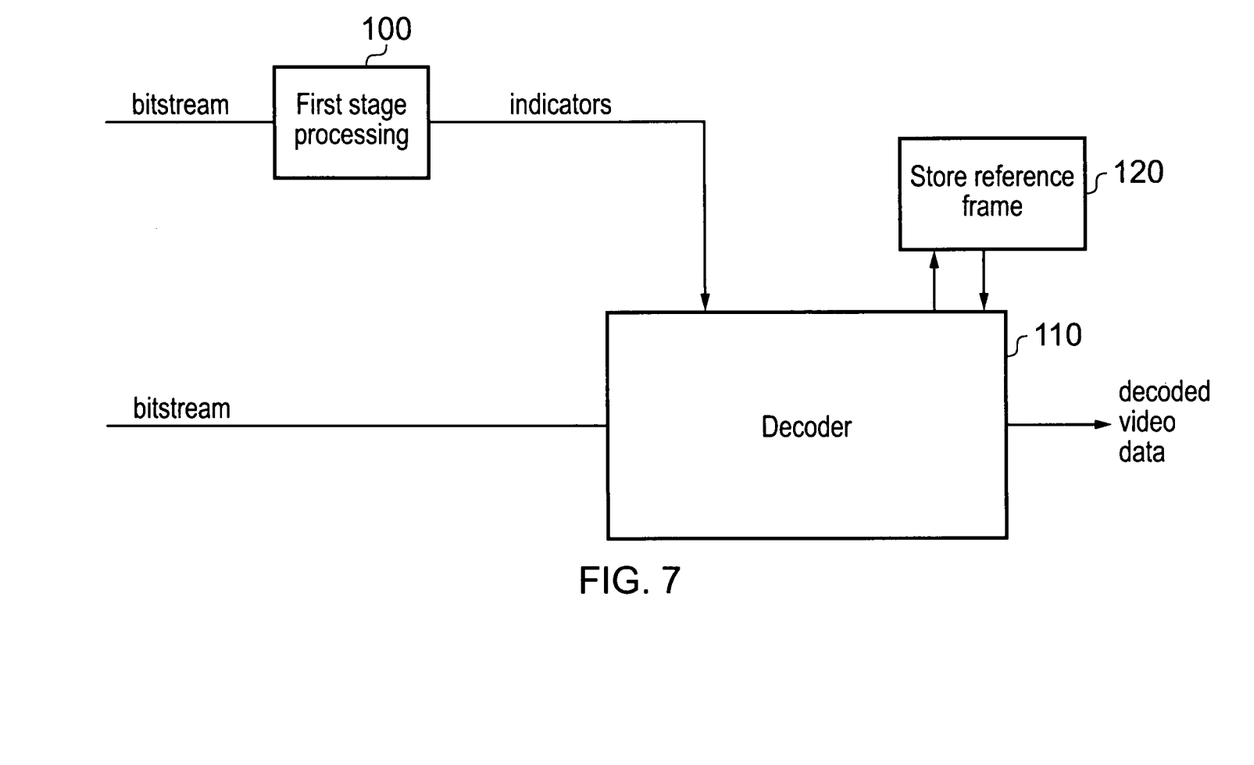
FIG. 7 shows video processing apparatus according to an embodiment of the present invention.

FIG. 7 shows schematically an embodiment of the present invention. In this embodiment, first stage processing is performed by first stage processing circuitry 100 and this initial stage simply extracts from the bitstream indicators indicating which portions of reference frames are not required for decoding other frames. This indicator information is input to decoder circuitry 110. Decoder circuitry 110 receives the bitstream as well and decodes it to form decoded video data. During the decoding reference frames are generated which are used for decoding other frames where there is interframe prediction used in the encoding scheme. When storing these reference frames the decoder 110 uses the indicator information from the first stage processing circuitry 100 to determine which portions of the reference frames are not required in decoding and these portions are not stored in reference frame storage 120.

Thus, in this embodiment the first stage processing is simply used to determine the indicators and there is no further processing of the input bitstream. As this initial processing is a faster process then the decoder will naturally over time run in advance of the decoder and thus, will provide the indicators to the decoder at the required moment. If at start up the indicators for the initial frames are not received by the decoder at the time it wishes to store the reference frames then it simply stores the whole reference frame and no errors are generated simply the optimizations of the present invention do not occur immediately.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims. For example, various combinations of the features of the following dependent claims could be made with the features of the independent claims without departing from the scope of the present invention.

We claim:

1. A video processing apparatus comprising:
   first stage video processing circuitry for receiving a bitstream of compressed encoded video data representing a plurality of frames of video data and configured to perform one or more processing operations on said input compressed video data;
   analysing circuitry configured to analyse said processed bitstream and for determining for at least one of said plurality of frames at least one portion of said at least one frame that is not required in the decoding of other frames and for generating at least one indicator indicating said at least one portion;
   frame reconstruction processing circuitry configured to perform frame reconstruction on said compressed encoded video data and to receive said at least one indicator and to generate at least one partial reference frame for use in decoding other frames from said bitstream and said at least one indicator, said frame reconstruction processing circuitry being configured to determine from said at least one indicator said at least one portion that is not required for decoding other frames and to generate said partial reference frame as a frame that does not include said at least one portion and to output said partial reference frame for use in decoding said other frames.

2. A video processing apparatus according to claim 1, wherein said first stage processing circuitry is configured to generate and output to a data store an intermediate representation of said input video data, and said frame reconstruction processing circuitry is configured to retrieve said intermediate representation of said input video data from said data store and to process said intermediate representation data to perform said frame reconstruction.

3. A video processing apparatus according to claim 2, wherein said first stage video processing circuitry comprises parsing circuitry, said intermediate representation data comprising partially decompressed video data comprising a plurality of instructions.

4. A video processing apparatus according to claim 1, wherein said analysing circuitry is configured to analyse a plurality of portions of said at least one frame and said analysing circuitry comprises a predictor for predicting for each of said plurality of portions whether it is unlikely or not to be used in decoding of other frames and in response to predicting that it is likely to be used said analysing circuitry is configured not to generate said at least one indicator for said portion of said frame.

5. A video processing apparatus according to claim 4, wherein said predictor determines an amount of data present for each portion and in response to said amount of data for said portion being greater than a predetermined amount predicts that said portion is unlikely to be used.

6. A video processing apparatus according to claim 1, wherein said analysing circuitry is configured to determine a type of encoding of a frame said processed bitstream represents and in response to determining a predetermined type of encoding for said frame not to generate said at least one indicator for said frame.

7. A video processing apparatus according to claim 1, wherein said analysing circuitry comprises scoreboard generating circuitry for analysing said processed bitstream and for determining for at least some of said frames, portions of said frames that are to be used in the decoding of other frames and portions that are not to be used and for generating scoreboard data for said at least some frames, said scoreboard data comprising a plurality of said at least one indicator, said plurality of indicators each providing an indication as to whether a corresponding portion is required for decoding other frames or not.

8. A video processing apparatus according to claim 1, wherein said encoded video data comprises a plurality of macroblocks forming said frames, each macroblock representing a plurality of pixels forming an area of said frame, said at least one portion of said frame comprising a macroblock.

9. A video processing apparatus according to claim 2, wherein said analysing circuitry is configured to output said at least one indicator to said data store, said frame reconstruction processing circuitry being configured to retrieve said at least one indicator and said intermediate representation data from said data store.

10. A video processing apparatus according to claims 1, wherein said analysing circuitry is configured to output said at least one indicator to said frame reconstruction circuitry.

11. A video processing apparatus according to claim 1, said video processing apparatus further comprising said data store.

12. A video processing apparatus according to claim 1, wherein said frame reconstruction processing circuitry is configured to output said at least one partial reference frame to a frame data store.

13. A video processing apparatus according to claim 12, wherein said data store and said frame data store comprise a same data store.

14. A video processing apparatus according to claim 1, wherein said first stage video processing circuitry is configured to process said received encoded video bitstream in advance of said frame reconstruction processing said bitstream by at least a plurality of frames, and said analysing circuitry is configured to detect when said at least one frame is not required to decode any further frames currently being processed by said first stage video processing and in response to said detection to output said at least one indicator.

15. A method of processing data comprising the steps of:
receiving a bitstream of compressed encoded video data representing a plurality of frames of video data and performing one or more processing operations on said input compressed video data to generate a processed bitstream;
analysing said processed bitstream and determining for at least one of said plurality of frames at least one portion of said at least one frame that is not required in the decoding of other frames and generating at least one indicator indicating said at least one portion;
performing frame reconstruction on said compressed encoded video data and receiving said at least one indicator, including generating at least one partial reference frame for use in decoding other frames from said compressed encoded video data and said at least one indicator, by determining from said at least one indicator said at least one portion that is not required for decoding other frames and generating said partial reference frame as a frame that does not include said at least one portion;
outputting said partial reference frame.

16. A method according to claim 15, wherein said step of performing one or more processing operations on said compressed encoded video data comprises generating an intermediate representation of said input video data, and outputting said intermediate representation and output to a data store; and
said step of performing frame reconstruction on said compressed encoded video data, comprises retrieving said intermediate representation of said input video data from said data store and processing said intermediate representation data to perform said frame reconstruction.

17. A method according to claim 16, wherein said performing one or more processing operations on said input compressed video data to generate said intermediate representation of said input video data comprises parsing said input video data to generate partially decompressed video data comprising a plurality of instructions.

18. A method according to claim 15, wherein said analysing step comprises predicting for each of a plurality of portions whether it is unlikely or not to be used in decoding of other frames and in response to predicting that it is likely to be used said analysing step does not generate said at least one indicator for said portion of said frame.

19. A method according to claim 18, wherein said analysing step comprises determining an encoding type for a frame said processed bitstream data represents and in response to a determining a predetermined type of encoding for a frame said analysing step does not generate said at least one indicator for said frame.

20. A method according to claim 15, wherein said analysing step comprises determining for at least some of said frames, portions of said frames that are to be used in the decoding of other frames and portions that are not to be used and generating scoreboard data for said at least some frames, said scoreboard data comprising a plurality of said at least one indicator, said plurality of indicators each providing an indication as to whether a corresponding portion is required for decoding other frames or not.

21. A method according to claim 15, wherein said processing step of performing one or more processing operations on said input compressed video data bitstream is performed in advance of said generating at least one partial reference frame step by at least a plurality of frames, and said analysing step includes detecting when said at least one frame is not required to decode any further frames currently being processed by said processing step and in response to said detection outputting said at least one indicator.

22. A non-transitory computer-readable storage medium for storing a computer program which when executed on a processing apparatus controls said processing apparatus to perform steps in a method according to claim 15.

23. A video data processing device comprising:
means for receiving a bitstream of compressed encoded video data representing a plurality of frames of video data and for performing one or more processing operations on said input compressed video data to generate and output to a data store an intermediate representation of said input video data;
means for analysing said intermediate representation data and for determining for at least one of said plurality of frames at least one portion of said at least one frame that is not required in the decoding of other frames and for generating at least one indicator indicating said at least one portion;
means for retrieving from said data store said intermediate representation data and for receiving said at least one indicator and for generating at least one partial reference frame for use in decoding other frames from said intermediate representation data and said at least one indicator;
means for determining from said at least one indicator said at least one portion that is not required for decoding other frames and for generating said partial reference frame as a frame that does not include said at least one portion and for outputting said partial reference frame for use in decoding said other frames.

* * * * *